US007042968B1

(12) United States Patent
Jansen et al.

(10) Patent No.: US 7,042,968 B1
(45) Date of Patent: May 9, 2006

(54) EFFICIENT MULTIPURPOSE CODE MATCHED FILTER FOR WIDEBAND CDMA

(75) Inventors: Kaj Jansen, Salo (FI); Janne Koivisto, Turku (FI)

(73) Assignee: Nokia Corporation, Espoo (FI)

(*) Notice: Subject to any disclaimer, the term of this patent is extended or adjusted under 35 U.S.C. 154(b) by 752 days.

(21) Appl. No.: 09/950,023

(22) Filed: Sep. 12, 2001

(51) Int. Cl.
*H04B 3/60* (2006.01)

(52) U.S. Cl. .................................. 375/347

(58) Field of Classification Search ............... 375/267, 375/143, 298, 299, 343, 347, 348, 350, 152, 375/130, 140, 144, 146, 148; 455/101, 132; 708/422, 426
See application file for complete search history.

(56) References Cited

U.S. PATENT DOCUMENTS

| 5,563,604 | A  | * | 10/1996 | Brandao et al. | 342/159 |
| 6,243,561 | B1 |   | 6/2001  | Butler et al.  |         |
| 6,389,003 | B1 | * | 5/2002  | Barroso        | 370/342 |
| 6,510,187 | B1 | * | 1/2003  | Saito et al.   | 375/344 |
| 6,680,727 | B1 | * | 1/2004  | Butler et al.  | 375/147 |
| 6,778,591 | B1 | * | 8/2004  | Sato           | 375/147 |
| 2003/0123407 | A1 | * | 7/2003 | Arimitsu     | 370/335 |
| 2003/0147456 | A1 | * | 8/2003 | Kumura       | 375/148 |

OTHER PUBLICATIONS

Samsung Electronics, Co. Ltd.: "New CPICH Transmission Scheme for 4-antenna Transmit Diversity", TSG-RAN Working Group 1 Meeting # 15, Online! Aug. 25, 2000, XP002227008 (6 pages).
Holma and Toskala: "WCDMA for UMTS" Jan. 1, 2000, John Wiley & Sons, England XP002237514, p. 103.
3$^{rd}$ Generation Partnership Project; Technical Specification Group Services and System Aspects; IP Multimedia (IM) Subsystem-Stage 2 (Release 5), 3GPP TS 23.228 v5.0.0 (204), pp. 1-126.

* cited by examiner

*Primary Examiner*—Kenneth Vanderpuye
*Assistant Examiner*—Dung X. Nguyen
(74) *Attorney, Agent, or Firm*—Alston & Bird LLP

(57) ABSTRACT

The present invention is a system, mobile device and process. In a system, including a plurality of transmitters which transmit from at least one of the transmitters first and second complex sequences respectively from two spatially diverse antennas of the at least one transmitter to a mobile device, a method at the mobile device in accordance with the invention includes demodulating the first and second complex sequences to produce demodulated complex first and second sequences; detecting the demodulated first and second complex sequences to produce detected complex first and second sequences by multiplying respectively the demodulated first and second complex sequences with complex conjugates thereof; averaging a function of the complex detected first and second sequences to produce an averaged function; and processing the averaged function to detect a time, relative to a system time reference, of at least one peak therein resultant from the transmission of the first and second complex sequences.

57 Claims, 3 Drawing Sheets

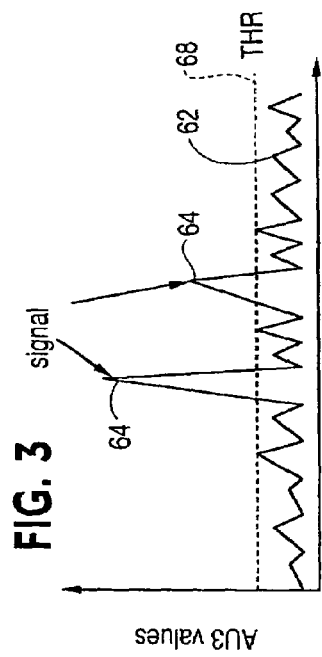
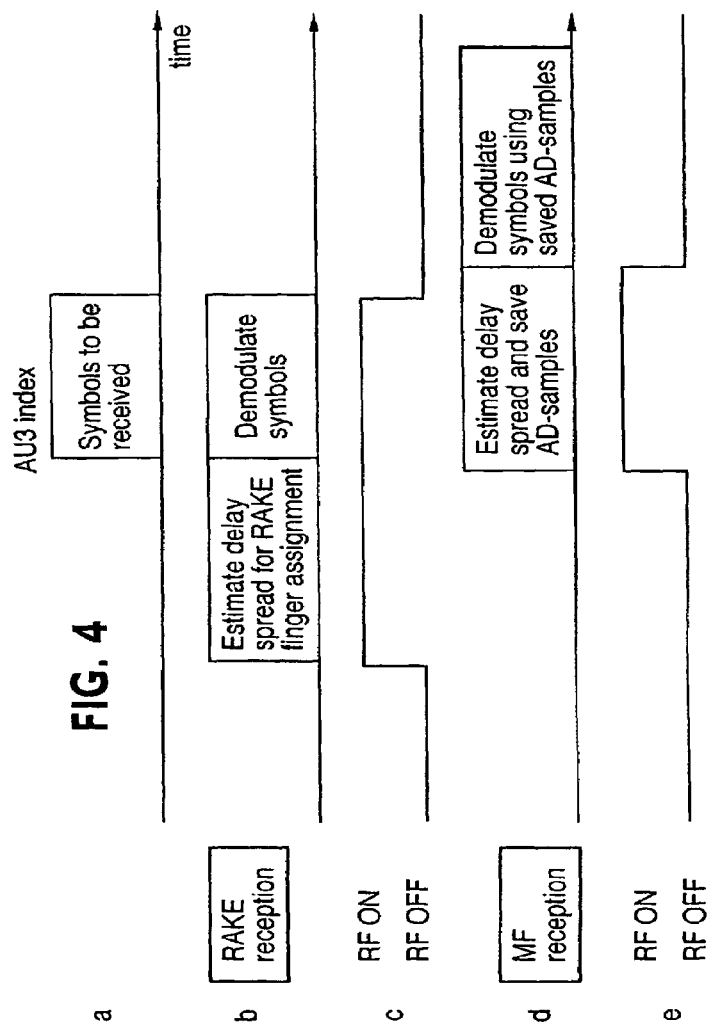

EFFICIENT MULTIPURPOSE CODE MATCHED FILTER FOR WIDEBAND CDMA

BACKGROUND OF THE INVENTION

1. Field of the Invention

The present invention relates to mobile radio terminals such as, but not limited to, mobile radio terminals described by the 3GPP TS 25.211 3.7.0 (2001-06) Technical Specification which is incorporated herein by reference in its entirety.

2. Description of the Prior Art

As general background, the aforementioned 3GPP Technical Specification defines radio transmissions to mobile data receivers employing radio frames each having 15 slots. The length of each frame is 38,400 chips and each slot is 2,560 chips.

The common downlink physical channels in the Technical Specification include a common pilot channel (CPICH) which carries predefined bit/symbol sequences as described in Chapter 5.3.3.1. The CPICH channel may utilize two spatially diverse antennas which respectively transmit first and second complex sequences. The CPICH channel is transmitted from both antennas using the same channelization and scrambling code but, the predefined symbol sequence of each antenna is different.

FIG. 1 illustrates a diagram of the predefined symbol sequences of the CPICH channel for the antennas. Antenna 1 transmits a repeating sequence of symbols "A" and antenna 2 transmits a repeating sequence of alternating negative pairs of symbols "−A" and "A". The symbols themselves are transmitted as first and second complex sequences. The spreading code utilized is 256 chips per bit.

The Technical Specification, while describing the use of spatial diverse antennas for transmitting the predefined symbol sequences for the CPICH channel, does not specify how the receiver processes the spatially diverse transmissions.

RAKE demodulators are well known. For example, see pages 842–851 of Digital Communications, 4$^{th}$ Edition, John P. Proakis, McGraw-Hill 2001, and the Assignee's U.S. patent application Ser. No. 09/915,382, filed Jul. 27, 2001, "Method and Apparatus for Synchronization" which are incorporated herein by reference in their entirety. A RAKE receiver detects at least one peak with multiple peaks representing reception of multipath components of the transmission. The fingers of the RAKE receiver are aligned in time with as many multipath components as possible so as to increase the signal level which is detected. The number of fingers in a RAKE receiver used for signal detection may be set up to a maximum number designed into the receiver. The number of fingers which are used corresponds to the number of peaks detected in the received transmissions up to the maximum number of fingers designed into the receiver.

SUMMARY OF THE INVENTION

The present invention provides an efficient matched filter which is used to estimate channel impulse response of transmitted constant symbol patterns such as, but not limited to, the aforementioned symbols of the CPICH channel.

Channel impulse response of the matched filter of the present invention may be used with real time samples or stored samples.

The first and second complex sequences transmitted by the two spatially diverse antennas in accordance with the Technical Specification may be estimated by multiplication with the complex conjugates thereof. A function of the complex detected first and second sequences is averaged to produce an averaged function. The averaged function is processed to detect a time, relative to a system time reference (which may, without limitation be obtained by detecting the predefined symbol sequences of the CPICH channel) of at least one peak therein resultant from the transmission of the first and second complex sequences. The time of the at least one peak relative to a system time reference may be used to set at least one finger in a RAKE receiver so as to detect the greatest possible signal strength.

Furthermore, in accordance with the invention, a power level of the peaks of the received transmissions being detected by the mobile device is transmitted to the system to control handoff. The handoff of transmissions may be from at least one group of transmitters to at least another group of transmitters.

In a CPU of the mobile device in accordance with the invention, complex conjugates of the maximum impulse response components may be multiplied with corresponding data results and added together to form a soft value used to estimate if symbol patterns have been received while the RF electronics are shut down.

The CPU of the mobile device in accordance with the invention may be used to dynamically change the length of the matched filter so as to meet different requirements pertaining to the use thereof such as minimizing power consumption in the mobile device.

Stored data samples can be estimated without the RF receiver electronics of the mobile device being turned on. The detected time of the peaks transmitted from the spatially diverse antennas, such as from the CPICH channel, defines the time reference for detection of the data. The stored data is applied to the matched filter and the response of the matched filter is used to detect the data.

Furthermore, the present invention utilizes the matched filter to detect the CPICH channel which reduces wakeup time compared to prior art RAKE receivers which increases standby time and reducing power consumption.

Finally, the detection of the at least one peak is made more efficient by the present invention by threshold detecting the averaged function so as to cut down the signal peaks inputted into the central processing unit.

In a system, including a plurality of transmitters which transmit from at least one of the transmitters first and second complex sequences respectively from two spatially diverse antennas of the at least one transmitter to a mobile device, a method at the mobile device in accordance with the invention includes demodulating the first and second complex sequences to produce demodulated complex first and second sequences; detecting the demodulated first and second complex sequences to produce detected complex first and second sequences by multiplying respectively the demodulated first and second complex sequences with complex conjugates thereof; averaging a function of the complex detected first and second sequences to produce an averaged function; and processing the average function to detect a time, relative to a system time reference, of at least one peak therein resultant from the transmission of the first and second complex sequences. The mobile device may comprise a RAKE receiver; and the time of the at least one peak may be used to set fingers in the RAKE receiver within the mobile device. The system may be a cellular system having a plurality of base stations at which the transmitters are located which transmit the first and second complex sequences, a power level of the peaks may be detected by the mobile device and the power level of the peaks may be transmitted to the system; and the system, in response to the power level, may control handoff of transmissions to the mobile device from one transmitter to another transmitter in the system. The method further may include performing a first averaging which averages the detected complex first and second sequences to produce complex averages thereof; detecting a magnitude of the complex averages; performing a second averaging of the magnitude of the complex averages to produce a real average; and wherein the processing of the averaged function is performed on the real average. The RAKE receiver may have n fingers and the number of fingers may be set equal to the number of peaks m when $m \leq n$ and equal to n when m>n. The averaged function may be threshold detected to pass only peaks therein which exceed a set threshold to the processing of the averaged function. The first and second sequences may be transmitted as a spread spectrum transmission using a pseudonoise spreading code to spread the first and second complex sequences across a base band with each bit in the first and second sequences being spread into n chips; and the mobile device may include a matched filter, responsive to the demodulated first and second complex sequences, comprising n stages which combine signals from at least some of the n stages to produce a matched filter output signal which is the demodulated complex first and second sequences. The number of stages n may be varied under control of a processor which processes the averaged function. The first and second complex sequences may be phase references representative of a phase of the transmitter transmitting the first and second complex sequences; and the mobile device may detect the first and second phase references and may detect data transmissions to the mobile device from the one transmitter using the first and second phase references. Data may be transmitted simultaneously with the phase references to the mobile device and stored; and thereafter the stored data is demodulated using the stored phase references while demodulation is turned off.

The mobile device may include a matched filter, responsive to the demodulated first and second complex sequences, comprising n stages which combine signals from at least some of the n stages to produce a matched filter output signal which is the demodulated complex first and second sequences; the first and second complex sequences may be phase references representative of a phase of the transmitter transmitting the first and second complex sequences; a data transmission may be transmitted simultaneously with the phase references to the mobile device; the mobile device may include a storage which stores the data; and the data may be retrieved from storage and may be detected using the matched filter and the stored phase references while the mobile device demodulation is turned off.

In a system including a plurality of transmitters which transmit from at least one of the transmitters first and second complex sequences respectively from two spatially diverse antennas of the at least one transmitter, a mobile device in accordance with the invention includes a demodulator which demodulates the first and second complex sequences to produce demodulated first and second complex sequences; a detector which detects the demodulated first and second complex sequences by multiplying respectively the demodulated first and second complex sequences with complex conjugates thereof to produce detected first and second complex sequences; at least one averaging unit, responsive to the detected first and second complex sequences, which produces an averaged function of the detected first and second complex sequences; and a processor, responsive to the averaged function, which detects a time, relative to a system time reference, of at least one peak therein resultant from the transmission of the first and second complex sequences. The mobile device may include a RAKE receiver; and the time of the at least one peak may be used to set fingers in the RAKE receiver within the mobile device. The RAKE receiver may have n fingers with the number of fingers being set equal to the number of peaks m when $m \leq n$ and equal to n when m>n. The system may be a cellular system having a plurality of base stations at which the transmitters are located which transmit the first and second complex sequences, a power level of the peaks may be detected by the mobile device and the power level may be transmitted to the system; and the system in response to the power level the system may control handoff of transmissions to the mobile device from one transmitter to another transmitter in the system.

The at least one averaging unit may comprise a first averaging unit, responsive to the detected first complex sequence, which produces a first complex average and a second averaging unit, responsive to the detected second complex sequence, which produces a second complex average; and a third averaging unit, responsive to a function of the first and second complex averages, which produces the averaged function. A first magnitude detector, responsive to the first complex average and coupled to the third averaging unit, may detect a magnitude of the first complex average which is an input to the third averaging unit; and a second magnitude detector, responsive to the first complex average and coupled to the third averaging unit, which detects a magnitude of the second complex average which is an input of the third averaging unit. A matched filter, responsive to the demodulated first and second complex sequences comprising n stages may combine signals from at least some of the n stages to produce a matched filter output signal which is the demodulated complex first and second sequences. The first and second complex sequences may be phase references representative of a phase of the transmitter transmitting the first and second complex sequences; and the mobile device may detect the first and second phase references and may detect data transmissions to the mobile device from the one transmitter using the first and second phase references. A threshold detector, coupled between the at least one averaging unit and the processor, may pass only peaks in the averaged function to the processor which exceed a set threshold. A power level detector, coupled to the complex first and second sequences, may detect a power level of the complex first and second sequences and may apply a control signal to the threshold detector to set the threshold in accordance with the detected power level.

The mobile device may include a matched filter, responsive to the demodulated first and second complex sequences, comprising n stages which combine signals from at least some of the n stages to produce a matched filter output signal which is the demodulated complex first and second sequences; the first and second complex sequences are phase references representative of a phase of the transmitter transmitting the first and second complex sequences; data may be transmitted simultaneously with the phase references to the mobile device; the mobile device includes a storage which stores the data; and the data may be retrieved from storage and is detected using the matched filter and the stored phase references while the mobile device demodulation is turned off.

BRIEF DESCRIPTION OF THE DRAWINGS

FIG. 3 illustrates the process of detection of peaks using a set threshold by a mobile device in accordance with the present invention.

FIG. 4 illustrates a diagram of detection of data transmissions in accordance with the invention while the RF electronics of the mobile device are turned off.

DETAILED DESCRIPTION OF THE PREFERRED EMBODIMENTS OF THE INVENTION

Figure 1:
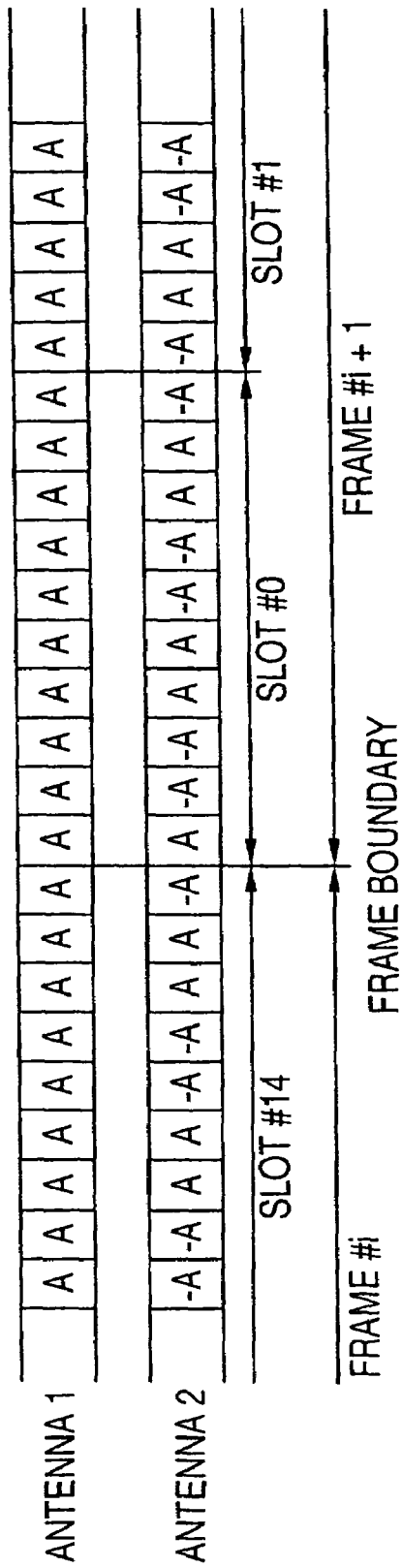
FIG. 1 illustrates a diagram of the CPICH channel of the 3GPP Technical Specification referred to above.
Figure 2:
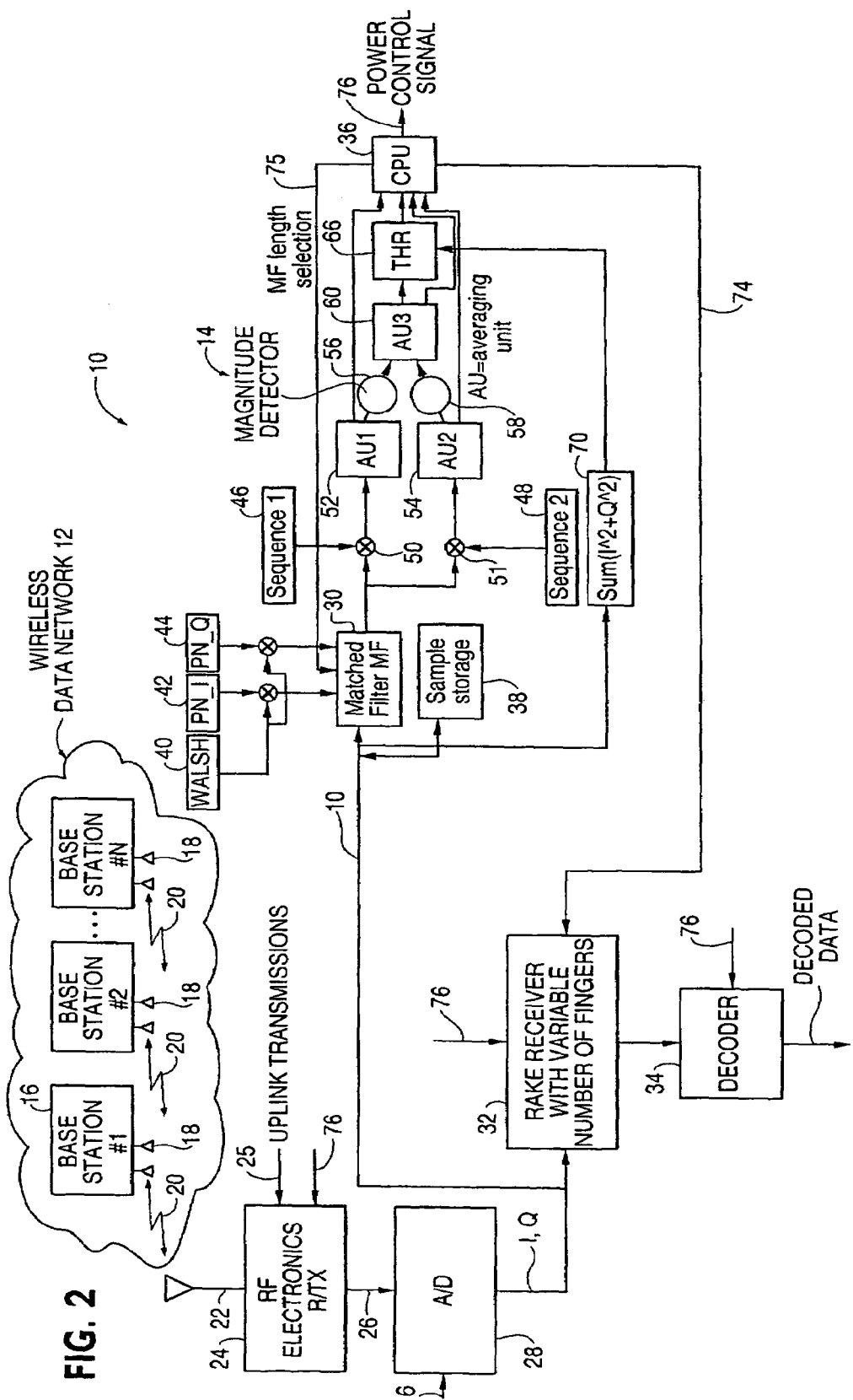
FIG. 2 illustrates a block diagram of a system including the mobile device of the present invention.

FIG. 2 illustrates a system 10 comprising a wireless data network 12 which may be in accordance with the Technical Specification but is not limited thereto and a mobile device 14 in accordance with the present invention. The wireless data network 12 has a plurality of base stations 16 of conventional design each containing at least two spatially diverse antennas 18 which transmit first and second complex sequences such as in accordance with the prior art of FIG. 1 but not limited thereto. The wireless data network 12 operates in a conventional fashion to control handoff. A signal strength estimation is transmitted from the mobile device 14 which is obtained from the transmissions 20 from one or more of the base stations 16 to one or more of the other base stations 16. The antenna 22 of the mobile device 14 transmits an uplink transmission of the detected power level of the transmission(s) 20 received by antenna 22 which provides the signal strength information to the wireless data network necessary for handoff to another one or more base stations 16 when the signal level of the data transmissions received from one or more of the base stations falls below a set level. The handoff process is conventional with the present invention using the detection of the signal strength of the first and second complex sequences in transmissions 20 such as the aforementioned CPICH channels from the multiple base stations to provide the wireless data network 12 with an estimate of signal strength from the various base stations. The "mobile transmissions" input 25 to RF electronics 24 is the power level information used to control handoff which is discussed in more detail below.

The RF electronics 24, which provide receiving and transmitting functions, receive the transmissions 20 of first and second complex sequences, such as the prior art of FIG. 1, from the two spatially diverse antennas 18 and outputs an analog output signal 26 which is applied to A to D converter 28. The resultant digitized data samples represent samples of the orthogonal I and Q components of each symbol. The demodulated first and second complex sequences outputted by the A to D converter 28 are applied to matched filter 30 and to a RAKE receiver 32 of standard design. The output of the RAKE receiver 32 is coupled to a decoder 34. The decoder 34 outputs decoded data received on channels selected by Walsh code generator 40 other than the CPICH channel in accordance with the prior art. The I and Q components of the symbols which are outputted from the A to D converter 28 are applied to the matched filter 30 which in a preferred embodiment has 256 actual stages which may be reduced in number for signal estimation under control of the control signal 75 outputted by the CPU 36 as described below. A sample storage 38 stores data samples produced by A to D converter 28 which may be read out and detected by the CPU 36 using a conventional soft decision process which is not part of the present invention once the timing of signal peaks obtained from the matched filter by the detecting of the first and second complex sequences of FIG. 1 which may contain phase information if the first and second sequences are from the CPICH channel.

A Walsh code generator 40 inputs channel selection codes for tuning of particular channels such as the aforementioned CPICH channel and the data channels. The PN_I and PN_Q generators 42 and 44 generate pseudorandom noise codes for dispreading the chips used for encoding each bit. Typically, the matched filter 30 contains a number of stages equal to the number of chips per bit, e.g. 256 in the aforementioned Technical Standard, with the number used for estimation of signal response being reducible under control of CPU 36. However, the number of stages used for channel estimation may be varied under control of the control signal 75 generated by CPU 36 to conserve power if sufficient signal level can be detected with signal components obtained from a smaller number of stages.

A first sequence generator 46 generates a complex conjugate of the first complex sequence transmitted by one of the antennas 18 and a second sequence generator 48 generates a complex conjugate of the second complex sequence transmitted by the other of the antennas 18. The invention should be understood as not being limited to antennas. The detected outputs of the sequence generators 46 and 48 are complex, are respectively applied to a first multiplier 50 and a second multiplier 51, which respectively multiply the demodulated first and second sequences outputted by the matched filter 30, to produce detected complex first and second sequences. The first detected complex sequence produced by multiplier 50 is applied to a first averaging unit 52 and the second detected second complex sequence produced by multiplier 51 is applied to second averaging unit 54.

The averaging units 52 and 54 may perform averaging by different methods. These averaging methods include taking numerous samples and computing an average thereof or integration with both methodologies being equivalent for purposes of the present invention. The averaging units 52 and 54 respectively average the detected first and second complex sequences outputted by the multipliers 50 and 51 and output complex averages which are respectively applied to magnitude detectors 56 and 58 which respectively are responsive to the first complex average and the second complex average.

The resultant real outputs from the magnitude detectors 56 and 58 are applied to a third averaging unit 60 which produces a real averaged function of the detected first and second complex sequences and, as illustrated in FIG. 3, typically contain a series of peaks 62 of relative small signal magnitude which represent the reception of low energy multipath components resultant from the transmission of the signal 20 from the diversity antennas 18 and a smaller number of higher energy peaks 64 representative of significant energy multipath components.

The third averaging unit 30 outputs real information which varies in magnitude and contains one or more of the higher energy signal peaks 64 containing significant signal level representative of different multi path components to produce maximum signal energy. Threshold detector 66 is utilized to set the threshold level 68 in FIG. 3 to reduce the data rate applied to the CPU 36 which reduces processing overhead.

The demodulated first and second complex sequences outputted from the A to D converter 28 are also applied to a power level detector 70 which, for example, may compute the real quantity of $I^2$ plus $Q^2$. The $I^2$ and $Q_2$ components are respectively representative of the orthogonal components of each symbol. The sum of $I^2+Q^2$ is used to set a threshold level input to the threshold detector 66.

The CPU 36 functions to detect a time of each of the peaks 64, relative to a system time reference, which may be obtained by using any known method, including detecting and using the phase information contained in the frames of the prior art of FIG. 1, so that the number of fingers used within the RAKE receiver 32 is set.

The CPU 36 outputs a signal 74 to the RAKE receiver 32. The signal 74 causes the RAKE receiver 32 to activate, within the number of fingers n designed in the RAKE receiver, a number of fingers used for detection. The number of fingers which are activated is equal to the number of peaks m when m≦n and equal to n when m>n.

The CPU 36 also generates a signal 75 for controlling selection of a number of stages in the matched filter 30. The number of stages nominally from the maximum number, e.g. 256 or reduced to a lesser number, for conserving power or otherwise if the matched filter 30 produces sufficient signal response.

The CPU 36 also outputs a power control signal 76 which may be used to turn off the RF electronics 24, A to D converter 28, RAKE receiver 32 and decoder 34 to conserve power when soft data detection by the CPU is used for data transmissions of a relative short duration is performed using the matched filter 30 in accordance with FIGS. 4d and e.

FIGS. 4a–c illustrate a time diagram of the operation of the prior art. The "RF ON" illustrated in FIG. 4c represents the estimation of the time spacing between peaks 64 in FIG. 3 and the subsequent demodulation of data symbols. The RF components are turned on only for the detecting of the time of the signal peaks 64 and turned of for the subsequent demodulation of symbols which decreases power consumption.

In accordance with the present invention, as illustrated in FIGS. 4d and 4e, the A to D samples outputted by the A to D converter 28, which are stored in sample storage 38 during estimation of the time of the peaks 64, are estimated using the impulse response of matched filter 30 while the RF electronics are turned off. The stored data samples from the sample storage 38 are demodulated, while the RF electronics and other components are turned off by power control signal 76. As seen in FIG. 4e, the RF electronics are turned off while demodulation of the stored data occurs using a conventional soft decision in CPU 36 which processes the signals inputted from the threshold detector 66. The channel containing the data stored within the sample storage 38 is selected by Walsh code generator 40 and the I and Q components are despread in the same manner by dispreading codes from PN_I and PN_Q generators 42 and 44 as used in the earlier signal processing.

While the invention has been described in terms of its preferred embodiments, it should be understood that numerous modifications may be made thereto without departing from the spirit and scope of the invention. It is intended that all such modifications fall within the scope of the appended claims.

The invention claimed is:

1. In a system, including a plurality of transmitters which transmit from at least one of the transmitters first and second complex sequences respectively from two spatially diverse antennas of the at least one transmitter to a mobile device, the method at the mobile device comprising:

demodulating the first and second complex sequences to produce demodulated complex first and second sequences;

detecting the demodulated first and second complex sequences to produce detected complex first and second sequences by multiplying respectively the demodulated first and second complex sequences with complex conjugates thereof;

averaging a function of the complex detected first and second sequences to produce an averaged function; and processing the averaged function to detect a time, relative to a system time reference, of at least one peak therein resultant from the transmission of the first and second complex sequences.

2. A method in accordance with claim 1 wherein:

the mobile device comprises a RAKE receiver; and the time of the at least one peak is used to set fingers in the RAKE receiver within the mobile device.

3. A method in accordance with claim 1 wherein:

the system is a cellular system having a plurality of base stations at which the transmitters are located which transmit the first and second complex sequences, a power level of the peaks is detected by the mobile device and the power level of the peaks is transmitted to the system; and the system, in response to the power level, controls handoff of transmissions to the mobile device from one transmitter to another transmitter in the system.

4. A method in accordance with claim 1 wherein the averaging a function of the detected complex first and second sequences to produce the averaged function comprises:

performing a first averaging which averages the detected complex first and second sequences to produce complex averages thereof;

detecting a magnitude of the complex averages;

performing a second averaging of the magnitude of the complex averages to produce a real average; and wherein the processing of the averaged function is performed on the real average.

5. A method in accordance with claim 2 wherein the averaging a function of the detected complex first and second sequences to produce the averaged function comprises:

performing a first averaging which averages the detected complex first and second sequences to produce complex averages thereof;

detecting a magnitude of the complex averages;

performing a second averaging of the magnitude of the complex averages to produce a real average; and wherein the processing of the averaged function is performed on the real average.

6. A method in accordance with claim 3 wherein the averaging a function of the detected complex first and second sequences to produce the averaged function comprises:

performing a first averaging which averages the detected complex first and second sequences to produce complex averages thereof;

detecting a magnitude of the complex averages;

performing a second averaging of the magnitude of the complex averages to produce a real average; and wherein the processing of the averaged function is performed on the real average.

7. A method in accordance with claim 2 wherein:
the RAKE receiver has n fingers with the number of fingers being set equal to the number of peaks m for $m \leq n$ and equal to n where $m > n$.

8. A method in accordance with claim 2 wherein:
the system is a cellular system having a plurality of base stations at which transmitters are located which transmit the first and second complex sequences, a power level of the peaks is detected by the mobile device and the power level of the peaks is transmitted to the system; and
the system, in response to the power level, controls handoff of transmissions to the mobile device from one transmitter to another transmitter in the system.

9. A method in accordance with claim 5 wherein:
the RAKE receiver has n fingers with the number of fingers being set equal to the number of peaks m for $m \leq n$ and equal to n where $m > n$.

10. A method in accordance with claim 1 wherein:
the averaged function is threshold detected to pass only peaks therein which exceed a set threshold to the processing of the averaged function.

11. A method in accordance with claim 2 wherein:
the averaged function is threshold detected to pass only peaks therein which exceed a set threshold to the processing of the averaged function.

12. A method in accordance with claim 3 wherein:
the averaged function is threshold detected to pass only peaks therein which exceed a set threshold to the processing of the averaged function.

13. A method in accordance with claim 4 wherein:
the averaged function is threshold detected to pass only peaks therein which exceed a set threshold to the processing of the averaged function.

14. A method in accordance with claim 5 wherein:
the averaged function is threshold detected to pass only peaks therein which exceed a set threshold to the processing of the averaged function.

15. A method in accordance with claim 6 wherein:
the averaged function is threshold detected to pass only peaks therein which exceed a set threshold to the processing of the averaged function.

16. A method in accordance with claim 7 wherein:
the averaged function is threshold detected to pass only peaks therein which exceed a set threshold to the processing of the averaged function.

17. A method in accordance with claim 8 wherein:
the averaged function is threshold detected to pass only peaks therein which exceed a set threshold to the processing of the averaged function.

18. A method in accordance with claim 9 wherein:
the averaged function is threshold detected to pass only peaks therein which exceed a set threshold to the processing of the averaged function.

19. A method in accordance with claim 10 wherein:
the set threshold level is a function of a power level in the demodulated first and second sequences.

20. A method in accordance with claim 11 wherein:
the set threshold level is a function of a power level in the demodulated first and second sequences.

21. A method in accordance with claim 12 wherein:
the set threshold level is set as a function of a power level in the demodulated first and second sequences.

22. A method in accordance with claim 13 wherein:
the set threshold level is set as a function of a power level in the demodulated first and second sequences.

23. A method in accordance with claim 14 wherein:
the set threshold level is a function of a power level in the demodulated first and second sequences.

24. A method in accordance with claim 15 wherein:
the set threshold level is a function of a power level in the demodulated first and second sequences.

25. A method in accordance with claim 16 wherein:
the set threshold level is a function of a power level in the demodulated first and second sequences.

26. A method in accordance with claim 17 wherein:
the set threshold level is a function of a power level in the demodulated first and second sequences.

27. A method in accordance with claim 18 wherein:
the set threshold level is a function of a power level in the demodulated first and second sequences.

28. A method in accordance with claim 1 wherein:
the first and second sequences are transmitted as a spread spectrum transmission using a pseudonoise spreading code to spread the first and second complex sequences across a base band with each bit in the first and second sequences being spread into n chips; and
the mobile device includes a matched filter, responsive to the demodulated first and second complex sequences, comprising n stages which combine signals from at least some of the n stages to produce a matched filter output signal which is the demodulated complex first and second sequences.

29. A method in accordance with claim 28 wherein:
the number of stages n is varied under control of a processor which processes the average function.

30. A method in accordance with claim 1 wherein:
the first and second complex sequences are phase references representative of a phase of the transmitter transmitting the first and second complex sequences; and
the mobile device detects the first and second phase references and detects data transmissions to the mobile device from the one transmitter using the first and second phase references.

31. A method in accordance with claim 30 wherein:
data is transmitted simultaneously with the phase references to the mobile device and stored; and
thereafter the stored data is demodulated using the stored phase references while demodulation is turned off.

32. A method in accordance with claim 1 wherein:
the mobile device includes a matched filter, responsive to the demodulated first and second complex sequences, comprising n stages which combine signals from at least some of the n stages to produce a matched filter output signal which is the demodulated complex first and second sequences;
the first and second complex sequences are phase references representative of a phase of the transmitter transmitting the first and second complex sequences;
a data transmission is transmitted simultaneously with the phase references to the mobile device;
the mobile device includes a storage which stores the data; and
the data is retrieved from storage and is detected using the matched filter and the stored phase references while the mobile device demodulation is turned off.

33. A method in accordance with claim 1 wherein:
the transmitters comprise base stations in a mobile data system.

34. In a system including a plurality of transmitters which transmit from at least one of the transmitters first and second complex sequences respectively from two spatially diverse antennas of the at least one transmitter, a mobile device comprising:

a demodulator which demodulates the first and second complex sequences to produce demodulated first and second complex sequences;

a detector which detects the demodulated first and second complex sequences by multiplying respectively the demodulated first and second complex sequences with complex conjugates thereof to produce detected first and second complex sequences;

at least one averaging unit, responsive to the detected first and second complex sequences, which produces an averaged function of the detected first and second complex sequences; and a processor, responsive to the averaged function, which detects a time, relative to a system time reference, of at least one peak therein resultant from the transmission of the first and second complex sequences.

35. A mobile device in accordance with claim 34 comprising:
a RAKE receiver; and
the time of the at least one peak is used to set fingers in the RAKE receiver within the mobile device.

36. A mobile device in accordance with claim 35 wherein:
the RAKE receiver has n fingers with the number of fingers being set equal to the number of peaks m for $m \leq n$ and equal to n where m>n.

37. A mobile device in accordance with claim 34 wherein:
the system is a cellular system having a plurality of base stations at which the transmitters are located which transmit the first and second complex sequences, a power level of the peaks is detected by the mobile device and the power level is transmitted to the system; and
the system in response to the power level the system controls handoff of transmissions to the mobile device from one transmitter to another transmitter in the system.

38. A mobile device in accordance with claim 35 wherein:
the system is a cellular system having a plurality of base stations at which transmitters are located which transmit the first and second complex sequences, a power level of the peaks is detected by the mobile device and the power level is transmitted to the system; and
the system in response to the power level the system controls handoff of transmissions to the mobile device from one transmitter to another transmitter in the system.

39. A mobile device in accordance with claim 34 wherein:
the at least one averaging unit comprises a first averaging unit, responsive to the detected first complex sequence, which produces a first complex average and a second averaging unit, responsive to the detected second complex sequence, which produces a second complex average; and
a third averaging unit, responsive to a function of the first and second complex averages, which produces the averaged function.

40. A mobile device in accordance with claim 35 wherein:
the at least one averaging unit comprises a first averaging unit, responsive to the detected first complex sequence, which produces a first complex average and a second averaging unit, responsive to the detected second complex sequence, which produces a second complex average; and
a third averaging unit, responsive to a function of the first and second complex averages, which produces the averaged function.

41. A mobile device in accordance with claim 36 wherein:
the at least one averaging unit comprises a first averaging unit, responsive to the detected first complex sequence, which produces a first complex average and a second averaging unit, responsive to the detected second complex sequence, which produces a second complex average; and
a third averaging unit, responsive to a function of the first and second complex averages, which produces the averaged function.

42. A mobile device in accordance with claim 37 wherein:
the at least one averaging unit comprises a first averaging unit, responsive to the detected first complex sequence, which produces a first complex average and a second averaging unit, responsive to the detected second complex sequence, which produces a second complex average;
a third averaging unit, responsive to a function of the first and second complex averages, which produces the averaged function.

43. A mobile device in accordance with claim 38 wherein:
the at least one averaging unit comprises a first averaging unit, responsive to the detected first complex sequence, which produces a first complex average and a second averaging unit, responsive to the detected second complex sequence, which produces a second complex average;
a third averaging unit, responsive to a function of the first and second complex averages, which produces the averaged function.

44. A mobile device in accordance with claim 39 comprising:
a first magnitude detector, responsive to the first complex average and coupled to the third averaging unit, which detects a magnitude of the first complex average which is an input to the third averaging unit; and
a second magnitude detector, responsive to the first complex average and coupled to the third averaging unit, which detects a magnitude of the second complex average which is an input of the third averaging unit.

45. A mobile device in accordance with claim 40 comprising:
a first magnitude detector, responsive to the first complex average and coupled to the third averaging unit, which detects a magnitude of the first complex average which is an input to the third averaging unit; and
a second magnitude detector, responsive to the first complex average and coupled to the third averaging unit, which detects a magnitude of the second complex average which is an input of the third averaging unit.

46. A mobile device in accordance with claim 41 comprising:
a first magnitude detector, responsive to the first complex average and coupled to the third averaging unit, which detects a magnitude of the first complex average which is an input to the third averaging unit; and
a second magnitude detector, responsive to the first complex average and coupled to the third averaging unit, which detects a magnitude of the second complex average which is an input of the third averaging unit.

47. A mobile device in accordance with claim 42 comprising:
a first magnitude detector, responsive to the first complex average and coupled to the third averaging unit, which detects a magnitude of the first complex average which is an input to the third averaging unit; and a second magnitude detector, responsive to the first complex average and coupled to the third averaging unit, which detects a magnitude of the second complex average which is an input of the third averaging unit.

48. A mobile device in accordance with claim 43 comprising:
a first magnitude detector, responsive to the first complex average and coupled to the third averaging unit, which detects a magnitude of the first complex average which is an input to the third averaging unit; and
a second magnitude detector, responsive to the first complex average and coupled to the third averaging unit, which detects a magnitude of the second complex average which is an input of the third averaging unit.

49. A mobile device in accordance with claim 34 comprising:
a matched filter, responsive to the demodulated first and second complex sequences comprising n stages which combine signals from at least some of the n stages to produce a matched filter output signal which is the demodulated complex first and second sequences.

50. A mobile device in accordance with claim 34 wherein:
the first and second complex sequences are phase references representative of a phase of the transmitter transmitting the first and second complex sequences; and
the mobile device detects the first and second phase references and detects data transmissions to the mobile device from the one transmitter using the first and second phase references.

51. A mobile device in accordance with claim 34 comprising:
a threshold detector, coupled between the at least one averaging unit and the processor, which passes only peaks in the averaged function to the processor which exceed a set threshold.

52. A mobile device in accordance with claim 51 comprising:
a power level detector, coupled to the complex first and second sequences, which detects a power level of the complex first and second sequences and applies a control signal to the threshold detector to set the threshold in accordance with the detected power level.

53. A mobile device in accordance with claim 35 comprising:
a threshold detector, coupled between the at least one averaging unit and the processor, which passes only peaks in the averaged function to the processor which exceed a set threshold.

54. A mobile device in accordance with claim 53 comprising:
a power level detector, coupled to the complex first and second sequences, which detects a power level of the complex first and second sequences and applies a control signal to the threshold detector to set the threshold in accordance with the detected power level.

55. A mobile device in accordance with claim 36 comprising:
a threshold detector, coupled between the at least one averaging unit and the processor, which passes only peaks in the averaged function to the processor which exceed a set threshold.

56. A mobile device in accordance with claim 55 comprising:
a power level detector, coupled to the complex first and second sequences, which detects a power level of the complex first and second sequences and applies a control signal to the threshold detector to set the threshold in accordance with the detected power level.

57. A mobile device in accordance with claim 34 wherein:
the mobile device includes a matched filter, responsive to the demodulated first and second complex sequences, comprising n stages which combine signals from at least some of the n stages to produce a matched filter output signal which is the demodulated complex first and second sequences;
the first and second complex sequences are phase references representative of a phase of the transmitter transmitting the first and second complex sequences;
data is transmitted simultaneously with the phase references to the mobile device;
the mobile device includes a storage which stores the data; and
the data is retrieved from storage and is detected using the matched filter and the stored phase references while the mobile device demodulation is turned off.

* * * * *

UNITED STATES PATENT AND TRADEMARK OFFICE
CERTIFICATE OF CORRECTION

PATENT NO. : 7,042,968 B1 Page 1 of 1
APPLICATION NO. : 09/950023
DATED : May 9, 2006
INVENTOR(S) : Jansen et al.

It is certified that error appears in the above-identified patent and that said Letters Patent is hereby corrected as shown below:

Column 9,
Line 18, "$m \leqq n$" should read --$m \leq n$--.

Column 11,
Line 25, "$m \leqq n$" should read --$m \leq n$--.

Signed and Sealed this

Ninth Day of January, 2007

JON W. DUDAS
*Director of the United States Patent and Trademark Office*